United States Patent
Nussey

(10) Patent No.: US 7,853,655 B2
(45) Date of Patent: Dec. 14, 2010

(54) INDIVIDUALIZED RSS FEEDS WITH ARCHIVES AND AUTOMATIC CLEANUP

(75) Inventor: Bill Nussey, Smyrna, GA (US)

(73) Assignee: Silverpop Systems Inc., Atlanta, GA (US)

( * ) Notice: Subject to any disclaimer, the term of this patent is extended or adjusted under 35 U.S.C. 154(b) by 934 days.

(21) Appl. No.: 11/163,570

(22) Filed: Oct. 23, 2005

(65) Prior Publication Data

US 2007/0094346 A1    Apr. 26, 2007

(51) Int. Cl.
*G06F 15/16* (2006.01)

(52) U.S. Cl. ............... 709/206; 709/204; 709/217; 709/219

(58) Field of Classification Search .......... 709/206
See application file for complete search history.

(56) References Cited

U.S. PATENT DOCUMENTS

| | | | |
|---|---|---|---|
| 6,324,569 B1 * | 11/2001 | Ogilvie et al. | 709/206 |
| 6,360,254 B1 | 3/2002 | Linden | |
| 6,671,715 B1 * | 12/2003 | Langseth et al. | 709/203 |
| 2002/0169954 A1 | 11/2002 | Bandini | |
| 2003/0097421 A1 | 5/2003 | Wille | |
| 2005/0267973 A1 * | 12/2005 | Carlson et al. | 709/228 |

OTHER PUBLICATIONS

Dyson, Tom. "MailBucket". Archived on Aug. 30, 2004 by the Internet Archive: <http://web.archive.org/web/20040830155220/http://www.mailbucket.org/>, pp. 1-2.*

Dyson, Tom. Representative Feed from MailBucket. Archived on Oct. 10, 2004 by the Internet Archive: <http://web.archive.org/web/20041010044603/www.mailbucket.org/syncato-general.xml>, pp. 1-16.*

Dyson, Tom. Representative Content File from MailBucket. Archived on Oct. 15, 2004 by the Internet Archive: <http://web.archive.org/web/20041015145523/www.mailbucket.org/xml-dev-160354.html>, p. 1.*

Dyson, Tom. Representative Content File from MailBucket (Source View). Archived on Oct. 15, 2004 by the Internet Archive: <http://web.archive.org/web/20041015145523/www.mailbucket.org/xml-dev-160354.html>, pp. 1-3.*

Udell, Jon. "MailBucket: an email-to-RSS gateway", InfoWorld. Sep. 30, 2003. <http://weblog.infoworld.com/udell/2003/09/30.html#a815>, pp. 1-4.*

(Continued)

*Primary Examiner*—Asad M Nawaz
*Assistant Examiner*—Christopher Biagini
(74) *Attorney, Agent, or Firm*—Smith Frohwein Tempel Greenlee Blaha, LLC; Gregory Scott Smith

(57) ABSTRACT

Personalized RSS feeds that are created for a user based on information associated with the user are generally unique and initially empty. By creating a generic RSS feed for receiving generic content items, the personalized RSS files can be pre-populated by copying the generic contents into the personalized RSS feeds. In addition, as content is received for a personalized RSS feed, the index files and/or the HTML based content files can be examined to identify expired items and then to delete the expired items.

6 Claims, 3 Drawing Sheets

OTHER PUBLICATIONS

"MailbyRSS Overview", iUpload. Archived on Oct. 20, 2004 by the Internet Archive: <http://web.archive.org/web/20041020052449/http://www.iupload.com/product/mailbyrss.asp>, pp. 1-2.*

Software Garden. "What is RSS?" Jul. 6, 2004: <http://rss.softwaregarden.com/aboutrss.html>.*

Dyson, Tom: "MailBucket", Aug. 30, 2004, pp. 1-2, XP008115493, Retrieved from the Internet: URL:http://web.archive.org/web/20040830155220/http://www.mailbucket.org/.

Anonymous: "Authentication, Authorization and Access Control, Introduction, Access control", May 12, 2001, pp. 160-172, XP002538971, Retrieved from the Internet: URL:http://www.apache-mirror-com/httpd/docs/apache-docs-1.3.23.pdf.zip.

Udell, J.: "MailBucket: an email-to-RSS gateway", Sep. 30, 2003, pp. 1-5, XP008114115, Retrieved from the Internet: URL:http://web.archive.org/web/20031211141916/http://weblog.infoworld.com/udell/2003/09/30.html.

"FEEDcombine", May 28, 2005, pp. 1-2, XP008114116, Retrieved from the Internet: URL:http://web.archive.org/web/20050528232942/http://www.feedcombine.co.uk/.

"iUpload Mail by RSS", Oct. 20, 2004, pp. 1-2, XP008114231, Retrieved from the Internet: URL:http://web.archive.org/web/20041020052449/http://www.iupload.com/product/mailbyrss.asp.

* cited by examiner

INDIVIDUALIZED RSS FEEDS WITH ARCHIVES AND AUTOMATIC CLEANUP

CROSS-REFERENCE TO RELATED APPLICATIONS

This application is related to, and incorporates herein by reference, United States Applications for Patent entitled
"GENERAL PURPOSE RSS CATCHER", filed on Oct. 23, 2005 and assigned Ser. No. 11/163,563,
"PROVISION OF SECURE RSS FEEDS UTILIZING A SECURE RSS CATCHER", filed on Oct. 23, 2005 and assigned Ser. No. 11/163,565,
"DELIVERY OF NON-SENSITIVE AND SENSITIVE INFORMATION THROUGH DUAL RECORD RSS", filed on Oct. 23, 2005 and assigned Ser. No. 11/163,566,
"DELIVERY OF SENSITIVE INFORMATION THROUGH SECURE RSS FEED", filed on Oct. 23, 2005 and assigned Ser. No. 11/163,567,
"FEEDBACK METRICS FOR RSS FEEDS", filed on Oct. 23, 2005 and assigned Ser. No. 11/163,568

BACKGROUND OF THE INVENTION

The present invention is related to the field of RSS based Internet communication, and, more particularly, to techniques for providing archived material in a personalized or individualized RSS feed and for automatically policing the RSS feeds by intelligently removing expired information.

A recent development in the world of Internet communications, and one that is rapidly gaining popularity, is the use of RSS feeds. An RSS feed is basically a mechanism to enable a customer to selectively allow content to be pushed to them. Content is provided through an RSS feed by placing the content on a server in accordance with the RSS standard format. In general, this includes an XML index file that contains various entries identifying available content. For instance, each entry may include a title, a summary or abstract and a link to another file, typically an HTML content file. The HTML content files actually contain the bulk of the content.

Content available through an RSS feed is obtained using a software client called an RSS reader or aggregator. The RSS feeds are based on an RSS standard and thus, they can easily be read by an RSS feed reader and most RSS feed readers can handle all of the current RSS standards. An RSS reader or aggregator is usually a stand alone program (though it may be integrated with an email program, an internet browser or other communications program) that periodically and automatically searches the Internet for new additions to any site to which the end user has subscribed by examining the XML index files. Some RSS readers will provide a popup window message when new material arrives on a subscribed RSS feed. Some RSS readers will check the RSS feeds for new content on a scheduled basis, while others wait until they are checked or actuated by the end user. Typically, the RSS readers can be customized as to the frequency of site checking and the ways that selected content is displayed. A user can subscribe to as many RSS feeds as they wish. RSS readers generally allow the user to define the manner in which the information is displayed. For instance, the information can be sorted by date and/or by the publisher of the data.

RSS feeds are similar to simply accessing web content through a browser but there is one, very significant difference. With an RSS feed, when any new material is available, the RSS feeds provide a very simple way for RSS readers to see when and what material has changed. RSS feed readers allow you to subscribe to feeds that you know contain important or useful information, and your RSS reader will notify you immediately whenever new content for your subscriptions is available. In short, once you've identified a useful resource that publishes an RSS feed, you can virtually skip searching for it altogether. In addition, the basic characteristics of RSS feeds allow users to be updated or informed of critical, real-time information as it becomes available. Advantageously, because the content coming from an RSS feed is controlled by the source, there is inherently a level assurance that the content can be trusted.

The United States Patent Applications, identified in the CROSS-REFERENCE TO RELATED APPLICATIONS section of this specification and that are incorporated into this specification by reference, disclose several inventions related to RSS feeds and more particularly, to the provision of personalized or individualized RSS feeds and new and useful inventions related thereto. Those skilled in the art will understand that one of the convenient aspects of an RSS feed is that when a user subscribes to the feed, the feed is already populated with material previously incorporated into the RSS feed prior to the user's optin date. For instance, if the RSS feed maintains the last 30 days of content, this content is immediately available to the user that subscribes to the RSS feed. However, when providing an individualized RSS feed, the subscribing user does not gain the benefit of a previously existing RSS feed as does the general RSS feed subscriber. Rather, the personalized RSS feed subscriber starts with a clean slate, or an empty RSS feed upon subscription. Thus, there is a need in the art for a technique to provide a pre-populated personalized RSS feed.

One disadvantage of RSS feeds is that the number of content items within a subscriber's inbox can become unmanageable over time. This is especially true in the context of a personalized RSS feed that provides the conversion of email messages into RSS content. If the RSS feed employs an expiration option, old items can be automatically removed from the subscriber's feed, however, this disadvantageously prevents the user from accessing older items that he or she may want to revisit. Thus, there is a need in the art for a technique for managing content within a personalized RSS feed. These and other needs in the art are addressed by the present invention as disclosed within this specification and as claimed below.

BRIEF SUMMARY OF THE INVENTION

The present invention addresses the above described needs in the art by providing a technique to pre-populate a personalized RSS feed and to police the size of personalized RSS feeds. More particularly, one aspect of the present invention is a technique to provide pre-populated personalized RSS feeds that include archived or recently available content items. This aspect of the present invention is realized by creating a generic RSS feed that receives and houses content items at least prior to the creation of a personalized RSS feed. Once the personalized RSS feed is created, the contents of the generic RSS feed are copied into the personalized RSS feed, thereby pre-populating the individualized RSS feed. Those skilled in the art will appreciate that it could useful to have different kinds of generic feeds so that new individualized RSS feeds can be loaded from one or more different generic RSS feeds.

Another aspect of the present invention is a technique to police the size of an RSS feed's inbox or index file without unnecessarily restricting the user's ability to access previously viewed content items. More specifically, the entries within an RSS index file are assigned expiration dates. In addition, the HTML files linked to in the RSS index file are also assigned expiration dates that may or may not be independent from the expiration dates for the RSS index file entries, depending on the embodiment. When items are received for the personalized RSS feed, the index file and /r the HTML files are examined for expired items. Any expired items are removed and the new content is incorporated into the personalized RSS feed. Additionally, expiration of the index entries or the HTML content files can be determined in other ways. One embodiment would allow index entries and HTML content files expiration times to be based on classification of the content item. Another embodiment would allow index entries and HTML content files expiration times to be based on timing that is unique to each individual recipient. Those skilled in the art will appreciate that there are many different expiration settings that can affect how individualized RSS feeds can be automatically maintained by controlling expiration of index entries and HTML content files.

DETAILED DESCRIPTION OF THE INVENTION

The present invention is directed towards providing improved features for RSS feeds in general and particularly for personalized RSS feeds. One aspect of the present invention is a technique to provide pre-populated personalized RSS feeds that include archived or recently available content items. Another aspect of the present invention is a technique to police the size of an RSS feeds inbox or index file without unnecessarily restricting the user's ability to access previously viewed content items.

Now turning to the drawings in which like labels and numbers refer to like elements throughout the several views, various embodiments and aspects of the present invention are described more fully.

Figure 1:
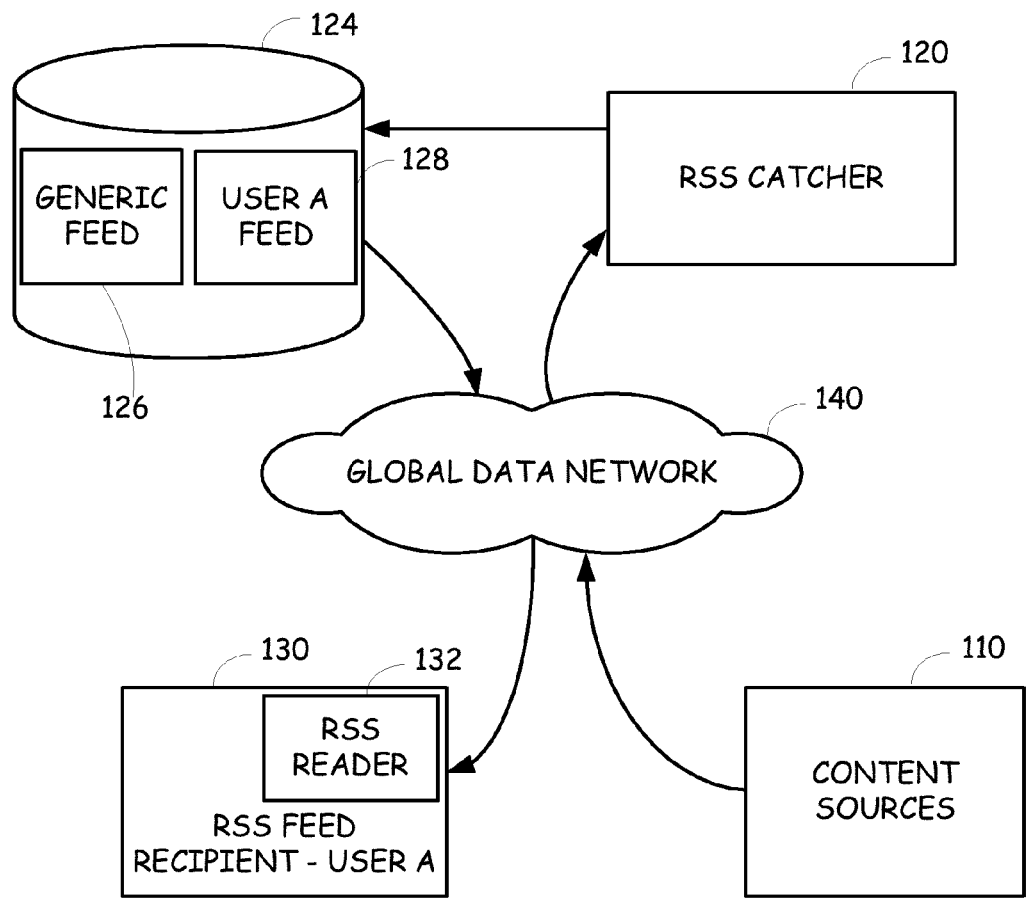
FIG. 1 is a system diagram of the employment of the RSS catcher within the environment implementing the pre-loading of a personalized RSS feed aspect of the present invention.

FIG. 1 is a system diagram of the employment of the RSS catcher within the environment implementing the pre-loading of a personalized RSS feed aspect of the present invention. One or more content sources 110 are employed to provide content or content items to the RSS catcher. The content sources 110 deliver email messages targeted for individual recipients over a data network 140. In an exemplary embodiment, the content items could be email messages transferred using SMTP technology.

An RSS catcher 120 is communicatively coupled to the data network 140 and is operable to receive the incoming content items from the content sources 110 and convert them into RSS feeds. This can be accomplished in a variety of manners. One exemplary embodiment of the present invention simply takes each content item and generates a unique RSS feed for that content item or, adds it into a unique RSS feed that already is in existence. In the illustrated environment, two RSS feeds are shown within the memory storage unit 124—a generic RSS feed 126 and an RSS feed personalized for User A. The User A feed is accessed by an RSS reader 132 operating in User A's computing environment 130. It will be appreciated that within the context of personalized RSS feeds, each new user or subscriber receives or operates under a unique ID that is created only for that user. The personalized fee created for each user is based on the user's unique ID. As such, once the personalized RSS feed is created for a unique user, it is empty. Thus, if the user subscribes desiring to obtain old newsletters, articles, publications or other content, the user is disappointed upon discovering that the RSS feed is empty of such items. This is due to the fact that the personalized RSS feed was created after such content had already been delivered.

Figure 2:
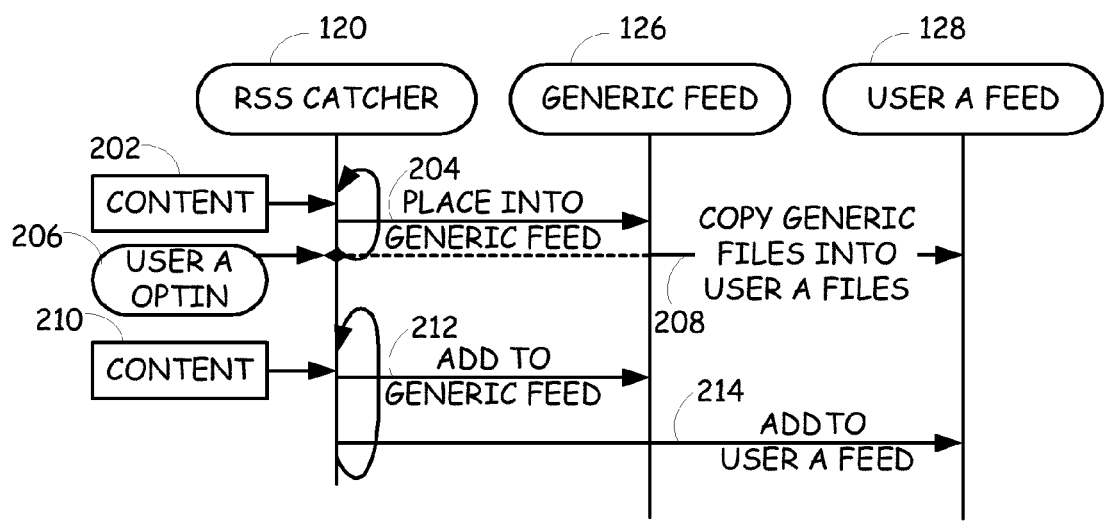
FIG. 2 is a timing diagram illustrating the functional states of the pre-loading aspect of the present invention.

FIG. 2 is a timing diagram illustrating the functional states of the pre-loading aspect of the present invention. Looking at FIGS. 1 and 2 together, the operation of this aspect of the present invention is illustrated. Prior to User A subscribing to a personalized RSS feed, the RSS catcher 120 is receiving content items that may be directed towards User A, other users, or just to a generic user. The RSS catcher 120 operates to receive this content 202 and creates a generic RSS feed. The RSS catcher, in cooperation with particular instructions and heuristics, can identify certain content items or unique feeds as generic or general. For instance, in one embodiment, all newsletters and articles can be placed into the generic feed. In other embodiment, all email messages that include the word "announcement" in the subject line can be included in the generic feed. In yet another embodiment, a fictitious entity can be created with a generic but unique address identifier. In this embodiment, a generic feed for this unique address identifier can be created. In yet another embodiment, many different generic RSS feeds can be created. In this embodiment, messages could be directed towards different generic feeds by content classification or other determination. When a new individualized feed is created, one or more generic feeds can be used to populate it. The determination of generic feeds can be set by content classification or other mechanisms. Those skilled in the art will appreciate that many other criteria can be applied and utilized in creating and populating a generic feed.

The content that is received and identified as generic 204, regardless of the technique used, is placed into the generic RSS feed 126. In one embodiment, the content placed into the generic RSS feed 126 can utilize generic personalization (e.g., "dear customer" rather than "dear bill"). Thus, as additional content is received as shown in the loop back in FIG. 2, the content is populated into the generic feed 126.

When User A subscribes (optin) 206, an RSS feed for User A 128 is created. The contents of the generic feed 126 are then copied 208 into the User A feed 128, thereby pre-populating User A's personalized feed. Advantageously, this aspect of the present invention enables User A to access old content, such as newsletters or the like, that were previously sent and captured into the generic feed. This content will instantly exist for User A, although it will not be personalized by directly addressing User A rather than a generic "customer". However, those skilled in the art will appreciate that processing at the RSS catcher side could implement a task to personalize the generic content as it is copied into the User A feed.

Another related aspect of the present invention is the employment of a side process that continually runs within the RSS catcher. For every item received, the side process examines the item to determine whether it should be entered into the generic feed or not. In one embodiment, the sender can make this determination. This can be accomplished by setting flags or by including other insignia within the content item.

Alternatively this decision can be made heuristically by the RSS catcher by applying various rules. For instance, the information obtained through examining metrics regarding the actions taken by several users, as described in the US Patent Application associated with application Ser. No. 11/163,568.

Figure 3:
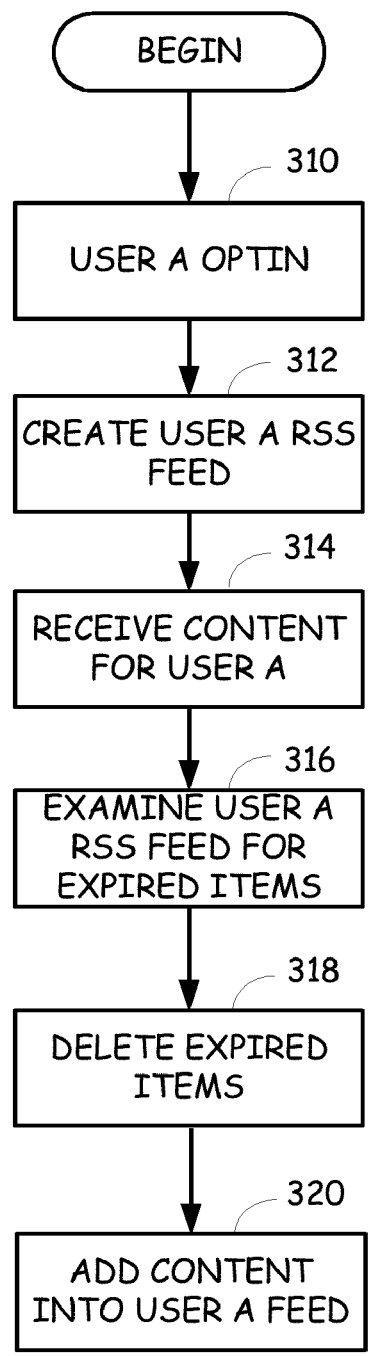
FIG. 3 is a flow diagram illustrating the steps involved in the automatic policing of the size of a personalized RSS feed aspect of the present invention.

FIG. 3 is a flow diagram illustrating the steps involved in the automatic policing of the size of a personalized RSS feed aspect of the present invention. It will be appreciated that one of the problems or technical hurdles associated with an RSS catcher based system is that the RSS index files can grow to large sizes as more and more messages are added into the RSS feed. One technique to address this problem has been to establish a system limit on how long to keep messages in the RSS index file. However, it will be appreciated that such a technique would require the system to check every single feed in the system on a periodic basis, such as everyday, to identify which messages should be removed from the RSS feed. This would be a time consuming and processor intensive task. The method illustrated in FIG. 3 overcomes this problem in a novel and useful manner. When User A subscribes to a personalized RSS feed 310, an RSS feed is created for User A 312 and as content items for User A are received, they are identified as content items for User A 314. At this point, the present invention then employs a process of policing User A's RSS feed by opening the RSS index file and checking for expired items 316. If an expired item is found, it is deleted from the RSS index file 318 and then the new content item is added to User A's RSS feed 320. Thus, rather than checking all of the RSS feeds continuously, the RSS feeds are only checked for expired items when a new item for that RSS feed is received. Advantageously, this aspect of the present invention also operates to ensure that the RSS feeds do not become empty.

Figure 4:
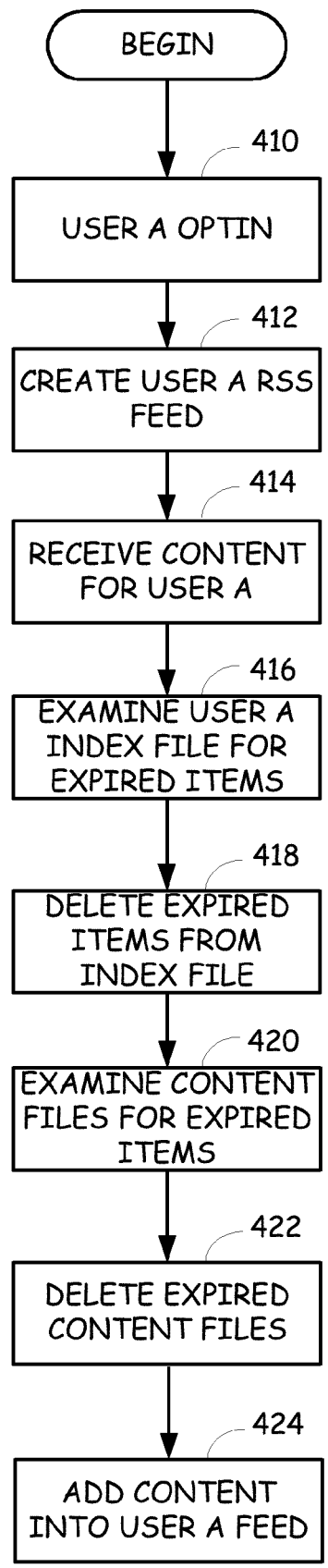
FIG. 4 is a flow diagram illustrating the steps involved in another embodiment of the automatic policing aspect of the present invention.

FIG. 4 is a flow diagram illustrating the steps involved in another embodiment of the automatic policing aspect of the present invention. It will be appreciated that the problem associated with large growth of an RSS feed is not just limited to the entries in the index file but, the associated HTML files created by the catcher also impose a problem. Simply deleting the HTML files when the associated entry in the index file is deleted is not an acceptable solution. Most RSS readers maintain copes of the original entries that appeared in the index file long after the index file has removed them. Thus, if a user clicks on one of the saved entries in the RSS reader that has been deleted from the index file, the user will most likely get a blank file or a broken link error message.

The present invention resolves this dilemma by delinking the expiration date of the index file entries from the HTML files. The method illustrated in FIG. 4 overcomes this problem in a novel and useful manner. When User A subscribes to a personalized RSS feed 410, an RSS feed is created for User A 412 and as content items for User A are received, they are identified as content items for User A 414. At this point, similar to the embodiment in FIG. 3, the RSS feed is examined for expired content items. However, this aspect of the invention utilizes different expiration dates for the index entries and the HTML files. Thus, the index file is first examined for expired entries 416. If an expired item is found, it is deleted from the RSS index file 418. Next, the HTML files of the RSS feed are examined to identify any expired files 420. If an expired item is found, the expired HTML file is deleted 422 and then the new content item is added to User A's RSS feed 424. Thus, rather than checking all of the RSS feeds continuously, the RSS feeds are only checked for expired items when a new item for that RSS feed is received. Advantageously, this aspect of the present invention also operates to ensure that the RSS feeds do not become empty. In addition, index entries that have been deleted from the RSS feed will not result in errors when a user attempts to access a content item that is stored in the RSS reader, at least until the HTML file expires.

Thus, this aspect of the present invention provides for the disassociation of expiration dates for index file entries and content files. For instance, the index file entries can be set to expire after 30 days but, the HTML files can remain in the system and accessible for 6 months as an example. In some embodiments, it may make sense for the HTML files to expire prior to the index file entries. The present invention is not limited to any particular expiration schema but rather, each of them are equally applicable to the present invention although, in and of themselves may be considered novel.

The specific expiration timing and dates for index entries and HTML content files can be calculated or preset using a variety of techniques. One technique simply sets expiration for index entries and HTML content files in terms of the number of days since the content item was created. Another technique sets a size or count limit. If the index entries or HTML content files exceed a predefined limit in terms of size in bytes or count, the oldest items are removed until the index entries or HTML content files are once again within the specified size or count. Another technique sets expiration times based on the classification of content placed into the RSS feeds. In one example, content items classified as newsletters might expire after 90 days and content items classified as daily news might expire after 7 days. Another technique involves setting expiration dates based on specific subscriber characteristics. In one example, a subscriber could request that all content be saved for 90 days and other subscriber may chose 30 days. In another example, the creator of the content might chose to maintain index entries and HTML content files for 90 days if a subscriber has paid a fee but only maintain them for 15 days if the service is used for free. As those versed in the art can see, there are many different ways to specific how content is expired.

While the foregoing specification illustrates and describes the various embodiments of this invention and the various aspects of this invention, it is to be understood that the invention is not limited to the precise construction herein disclosed. The invention can be embodied in other specific forms without departing from the spirit or essential attributes. In addition, various aspects of the present invention have been described. Not all of the aspects are required to gain novelty and various embodiments may utilize on a subset of the various aspects. Accordingly, reference should be made to the following claims, rather than to the foregoing specification, as indicating the scope of the invention.

What is claimed is:

1. A method for generating personalized RSS feeds, the method being performed by an RSS catcher device and comprising the steps of:

creating a plurality of generic RSS based files;

receiving generic content items pushed from a plurality of content sources, identifying each of the received generic content items as associated with one or more of the created generic RSS based files;

archiving the identified generic content items into the associated generic RSS based files;

subsequent to archiving the identified generic content items into the associated generic RSS based files, receiving a subscription request from a particular user for a personalized RSS based file that is personalized for the particular user;

creating the personalized RSS based file for the particular user; and pre-populating the personalized RSS based file by copying the archived generic content items from one of the one or more generic RSS based files into the personalized RSS based file thereby creating a personalized feed that is populated from its inception;

subsequently to creating the personalized RSS based file, receiving a pushed directed content item that is specifically directed towards the particular user by way of an address identifier of the particular user being included in the pushed directed content item;

in response to receiving the pushed directed content item, examining the personalized RSS based file to identify at least a subset of content items contained therein as expired items;

deleting the identified expired items from the personalized RSS based file; and adding the pushed content item directed towards the particular user to the personalized RSS based file thereby ensuring that the personalized RSS based file is never empty.

2. The method of claim 1, wherein subsequently to creating and pre-populating the personalized RSS based file and subsequently to the step of receiving a content item directed towards the particular user, further comprising the steps of:

examining HTML files associated with the personalized RSS based file for expired items; and deleting the expired items.

3. The method of claim 1, wherein a new content item is received and is identified for a generic RSS based file, further comprising the steps of:

examining the identified generic RSS based tile for expired items;

deleting the expired items from the identified generic RSS based file; and adding the new content item to the identified generic RSS based file thereby ensuring that the identified generic RSS based file is never empty.

4. The method of claim 1, wherein the step of creating a personalized RSS based file further comprises creating a unique URL that includes a unique identifier associated with a particular user, the unique identifier based at least in part on the identity of the particular user.

5. The method of claim 4, wherein the content item directed towards the particular user is an email message and the step of creating a URL that includes a unique identifier further comprises generating the unique identifier based at least in part on the address of the email message.

6. A method for providing controlled delivery of content to a particular user, wherein generic content items are received from a plurality of content sources and user specific content is received from at least one content source, the method being performed by an RSS catcher device and comprising the steps of:

receiving pushed generic content items pushed from the plurality of content sources;

creating one or more generic RSS based files and populating the one or more generic RSS based files by archiving the received pushed generic content items into one or more of the one or more generic RSS based files based on heuristics that identify the pushed generic content items;

subsequently to creating and populating the one or more generic RSS based files:

receiving a pushed directed content item that is directed towards the particular user by way of an address identifier of the particular user being included in the pushed directed content item;

based at least in part on at least a portion of the address identifier included in the pushed content item, generating a substantially unique identifier; and creating a personalized RSS based file that is personalized for the particular user and has a URL that is based at least in part on the substantially unique identifier;

pre-populating the personalized RSS based file by copying the archived generic content items from one of the one or more generic KSS based files into the personalized RSS based tile thereby creating a personalized feed that is populated from its inception;

subsequently to creating the personalized RSS based file, receiving a subsequent pushed directed content item that is specifically directed towards the particular user by way of the address identifier of the particular user being included in the subsequent pushed directed content item;

in response to receiving the subsequent pushed directed content item, examining the personalized RSS based file to identify at least a subset of content items contained therein as expired items;

deleting the identified expired items from the personalized RSS based file; and adding the subsequent pushed content item directed towards the particular user to the personalized RSS based file thereby ensuring that the personalized RSS based file is never empty.

\* \* \* \* \*